(12) United States Patent
Lin

(10) Patent No.: US 7,610,200 B2
(45) Date of Patent: Oct. 27, 2009

(54) SYSTEM AND METHOD FOR CONTROLLING SOUND DATA

(75) Inventor: David H. Lin, San Jose, CA (US)

(73) Assignee: LSI Corporation, Milpitas, CA (US)

( * ) Notice: Subject to any disclaimer, the term of this patent is extended or adjusted under 35 U.S.C. 154(b) by 831 days.

(21) Appl. No.: 10/930,624

(22) Filed: Aug. 30, 2004

(65) Prior Publication Data

US 2006/0047503 A1 Mar. 2, 2006

(51) Int. Cl.
*G10L 13/04* (2006.01)
*G06F 9/52* (2006.01)
*G06F 9/312* (2006.01)

(52) U.S. Cl. ............... 704/258; 704/270; 711/147; 711/168

(58) Field of Classification Search ........... 704/200, 704/201, 270, 278, 258; 711/150, 152, 168, 711/130, 147, 153
See application file for complete search history.

(56) References Cited

U.S. PATENT DOCUMENTS

| | | | | |
|---|---|---|---|---|
| 4,564,903 A * | 1/1986 | Guyette et al. | ............. | 711/201 |
| 4,805,106 A * | 2/1989 | Pfeifer | ............. | 710/200 |
| 5,222,217 A * | 6/1993 | Blount et al. | ............. | 707/204 |
| 5,363,498 A * | 11/1994 | Sakuraba et al. | ............. | 711/147 |
| 5,521,326 A * | 5/1996 | Sone | ............. | 84/631 |
| 5,539,896 A * | 7/1996 | Lisle | ............. | 711/150 |
| 5,761,643 A * | 6/1998 | Furuhashi | ............. | 704/504 |
| 5,811,706 A * | 9/1998 | Van Buskirk et al. | ............. | 84/604 |
| 5,987,506 A * | 11/1999 | Carter et al. | ............. | 709/213 |
| 5,991,711 A * | 11/1999 | Seno et al. | ............. | 704/3 |
| 6,032,117 A * | 2/2000 | Tsuiki et al. | ............. | 704/258 |
| 6,073,209 A * | 6/2000 | Bergsten | ............. | 711/114 |
| 6,175,821 B1 * | 1/2001 | Page et al. | ............. | 704/258 |
| 6,341,339 B1 * | 1/2002 | Kontothanassis et al. | ............. | 711/148 |
| 6,343,935 B1 * | 2/2002 | Clements | ............. | 434/156 |
| 6,370,626 B1 * | 4/2002 | Gagne et al. | ............. | 711/154 |
| 6,463,412 B1 * | 10/2002 | Baumgartner et al. | ............. | 704/246 |
| 6,785,783 B2 * | 8/2004 | Buckland | ............. | 711/153 |
| 7,003,632 B2 * | 2/2006 | Jamil et al. | ............. | 711/144 |
| 7,424,422 B2 * | 9/2008 | Graham, Jr. | ............. | 704/200 |
| 2006/0041434 A1 * | 2/2006 | Graham, Jr. | ............. | 704/278 |

OTHER PUBLICATIONS

Wikipedia, Definition of "Semaphore", 5 Pages.*
Wikipedia, "Compare-and-swap", 3 Pages, Mar. 2, 2009.*

* cited by examiner

*Primary Examiner*—Martin Lerner
(74) *Attorney, Agent, or Firm*—William W. Cochran; Cochran Freund & Young LLC

(57) ABSTRACT

A system and method for controlling access to parameter blocks of a sound processor. According to the method and system disclosed herein, the present invention includes a host, a sound processor coupled to the host, and at least two copies of a parameter block associated with the sound data. The sound processor can access a first copy of the at least two copies while the host is accessing a second copy of the at least two copies. As a result, parameter blocks are freely updated by the host processor and freely read by the sound processor without conflict and without performance loss.

11 Claims, 6 Drawing Sheets

Parameter Block List A Address Register

402

Parameter Block List B Address Register

404

Parameter Block Select 0-7 Registers

406

Parameter Block Select 0 = 0x00000000

| | Parameter Block List A | | Parameter Block List B |
|---|---|---|---|
| 0x100000 | Voice 0 (Sound Processor) | 0x200000 | Voice 0 (Host Processor) |
| 0x100200 | Voice 1 (Sound Processor) | 0x200200 | Voice 1 (Host Processor) |
| 0x100400 | Voice 2 (Sound Processor) | 0x200400 | Voice 2 (Host Processor) |
| 0x100600 | Voice 3 (Sound Processor) | 0x200600 | Voice 3 (Host Processor) |
| 0x100800 | Voice 4 (Sound Processor) | 0x200800 | Voice 4 (Host Processor) |
| ⋮ | ⋮ | ⋮ | ⋮ |
| 0x11FC00 | Voice 254 (Sound Processor) | 0x21FC00 | Voice 254 (Host Processor) |
| 0x11FE00 | Voice 255 (Sound Processor) | 0x21FE00 | Voice 255 (Host Processor) |

Parameter Block Select 0 = 0x00000008

| | Parameter Block List A | | Parameter Block List B |
|---|---|---|---|
| 0x100000 | Voice 0 (Sound Processor) | 0x200000 | Voice 0 (Host Processor) |
| 0x100200 | Voice 1 (Sound Processor) | 0x200200 | Voice 1 (Host Processor) |
| 0x100400 | Voice 2 (Sound Processor) | 0x200400 | Voice 2 (Host Processor) |
| 0x100600 | Voice 3 *(Host Processor)* | 0x200600 | Voice 3 *(Sound Processor)* |
| 0x100800 | Voice 4 (Sound Processor) | 0x200800 | Voice 4 (Host Processor) |
| ⋮ | ⋮ | ⋮ | ⋮ |
| 0x11FC00 | Voice 254 (Sound Processor) | 0x21FC00 | Voice 254 (Host Processor) |
| 0x11FE00 | Voice 255 (Sound Processor) | 0x21FE00 | Voice 255 (Host Processor) |

SYSTEM AND METHOD FOR CONTROLLING SOUND DATA

FIELD OF THE INVENTION

The present invention relates to sound processors, and more particularly to a system and method for controlling sound data.

BACKGROUND OF THE INVENTION

Sound processors produce sound by controlling digital data, which is transformed into a voltage by means of a digital-to-analog converter (DAC). This voltage is used to drive a speaker system to create sound. Sound processors, which are wave-table-based, use sound data from memory as a source, and modify that sound by altering the pitch, controlling the volume over time, transforming the sound through the use of filters, and employing other effects. These modifications to the source sound are controlled through a set of parameters.

Polyphonic sound processors create multiple sounds simultaneously by creating independent sound streams and adding them together. Each separate sound that can be played simultaneously is referred to as a voice, and each voice will have its own set of control parameters. The set of control parameters to control a voice is referred to as a parameter block.

FIG. 1 is a block diagram of a conventional system 50 for controlling sound data. The system 50 includes a host processor 52, a sound processor 54, and a memory unit 56. The memory unit 56 stores sound data 60 and parameter blocks, which contain control parameters for the sound data. For an advanced sound processor, there are many control parameters that the host processor 52 is able to write in order to control the production of sound by the sound processor 54. There can be several hundred control parameters per voice. Because of the large number, it becomes preferable to have them reside in the main system memory instead of in registers or random access memory (RAM) in the sound processor.

Also, with a large number of control parameters, it becomes important for both the host processor 52 and the sound processor 54 to access the control parameter blocks 62 without conflict. It may require many cycles for the host processor 52 to update the control parameters, and it may require many cycles for the sound processor to read all of the control parameters. Since many of the control parameters are related, if no method were used to avoid conflict, the sound processor 52 may read an inconsistent set of control parameters for a voice.

One conventional solution, which avoids conflict by the host processor 52 and the sound processor 54 in accessing parameter blocks, is to use locking mechanisms 64. Typically, there is a locking mechanism for each parameter block. If the host processor 52 or the sound processor 54 wants to access a particular parameter block, the host processor 52 or sound processor 54 will test a lock bit. If the lock bit was not set, the host processor 52 or sound processor 54 will set the lock bit and know that it can access the parameter block. If the lock bit was set, then the parameter block is currently being accessed, and the host processor 52 or sound processor 54 must wait until the parameter block is not locked before accessing it. The disadvantage of this solution is that each processor must wait for the parameter block to be free before accessing it. This may result in wasted time and reduced performance.

Another problem with this solution is that when locking a parameter block in system memory, a "test and set" instruction is necessary. This instruction is necessary because two modules may test whether the block is locked before either has a chance to set the lock bit. In this case, an error condition can occur where both modules think that they can access the memory block.

Accordingly, what is needed is a more efficient system and method for controlling access to parameter blocks of a sound processor. The system and method should be able to simple, cost effective and capable of being easily adapted to existing technology. The present invention addresses such a need.

SUMMARY OF THE INVENTION

The present invention provides a system and method for controlling access to parameter blocks of a sound processor. According to the method and system disclosed herein, the present invention includes a host, a sound processor coupled to the host, and at least two copies of a parameter block associated with the sound data. The sound processor can access a first copy of the at least two copies while the host is accessing a second copy of the at least two copies. As a result, parameter blocks are freely updated by the host processor and freely read by the sound processor without conflict and without performance loss.

BRIEF DESCRIPTION OF THE DRAWINGS

FIG. 5 is a diagram showing parameter block lists before host processor updates in accordance with the present invention.

FIG. 6 is a diagram showing parameter block lists after host processor updates in accordance with the present invention.

DETAILED DESCRIPTION OF THE INVENTION

The present invention relates to sound processors, and more particularly to a system and method for controlling sound data. The following description is presented to enable one of ordinary skill in the art to make and use the invention, and is provided in the context of a patent application and its requirements. Various modifications to the preferred embodiment and the generic principles and features described herein will be readily apparent to those skilled in the art. Thus, the present invention is not intended to be limited to the embodiment shown, but is to be accorded the widest scope consistent with the principles and features described herein.

The present invention provides a system and method for controlling sound data, where two copies of each parameter block, which contain voice control parameters, are provided. Having two copies of each parameter block enables the host processor to make updates to a voice's control parameters at the same time the sound processor reads the same voice's control parameters.

Although the present invention disclosed herein is described in the context of sound data, the present invention may apply to other types of data and still remain within the spirit and scope of the present invention.

Figure 1:
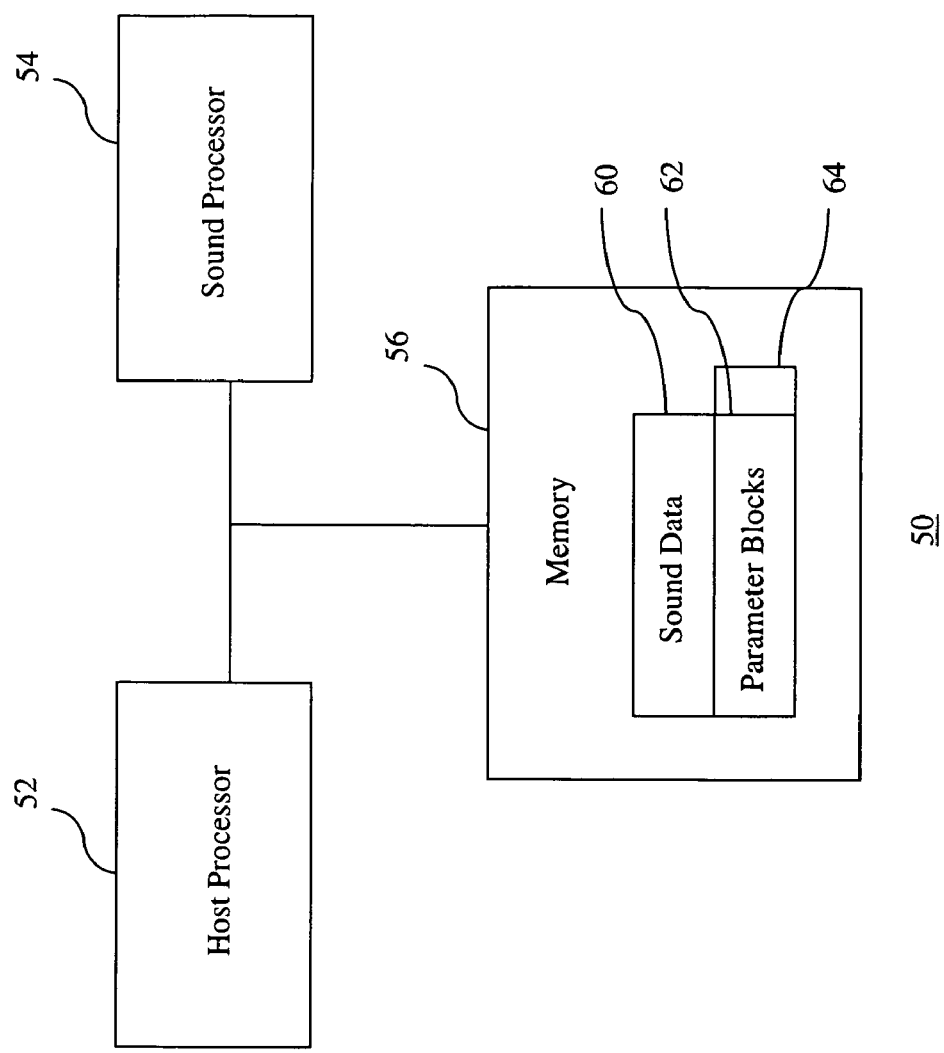
FIG. 1 is a block diagram of a conventional system for controlling sound data.
Figure 2:
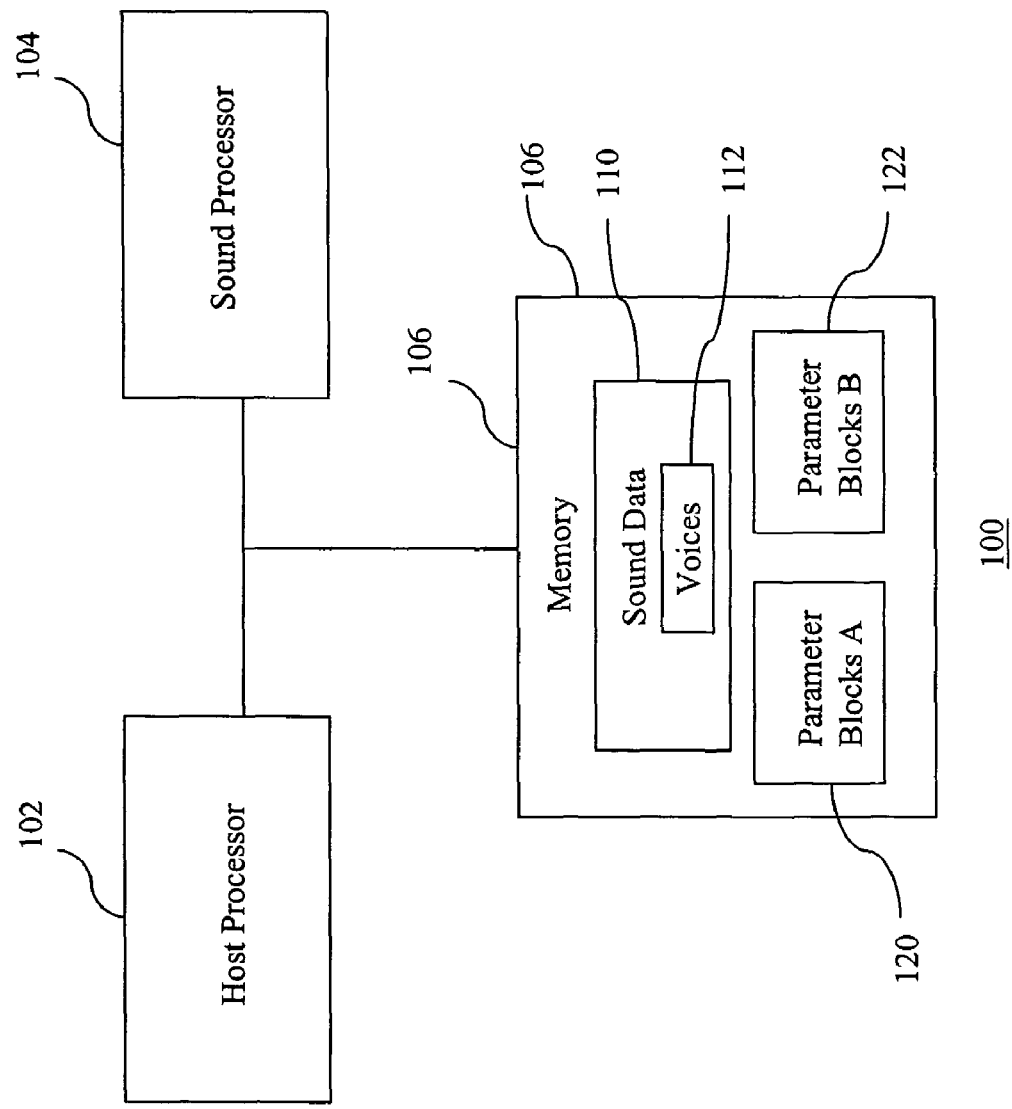
FIG. 2 is a block diagram of a system for controlling sound data in accordance with the present invention.

FIG. 2 is a block diagram of a system 100 for controlling sound data in accordance with the present invention. The system 100 includes a host processor 102, a sound processor 104, and a memory unit 106. The memory unit is the main system memory. The memory unit 106 stores sound data 110, which includes voices 112. Each voice 112 has a parameter block with control parameters used for controlling each voice 112.

Figure 3:
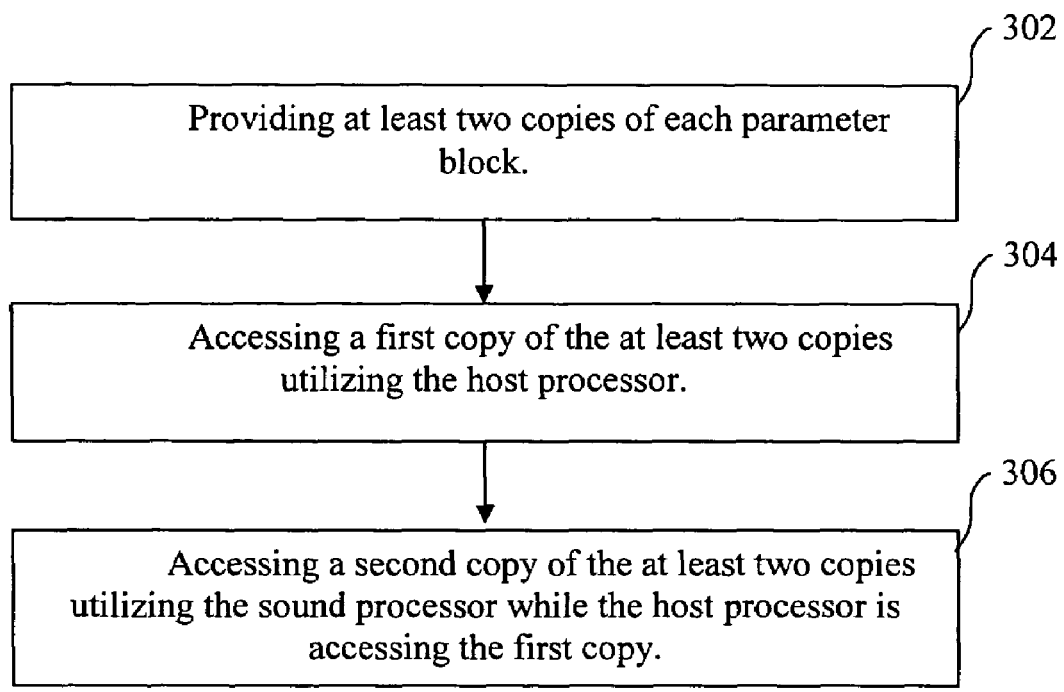
FIG. 3 is a flow chart showing a method for controlling sound data in accordance with the present invention.

FIG. 3 is a flow chart showing a method for controlling sound data in accordance with the present invention. Referring to both FIGS. 2 and 3 together, at least two copies of each parameter block are provided, in step 302. One copy is located in parameter blocks 120 and the other copy is located in parameter blocks 122. The two copies allow simultaneous access from the host processor 102 and the sound processor 104 to the parameter blocks 120 and 122. Accordingly, the host processor 102 can access a first copy, in step 304. The host processor 102 generally accesses a parameter block to update the control parameters. While the host processor 102 is accessing the first copy, the sound processor 104 can access a second copy, in step 306. In other words, at any given time one copy is owned by the sound processor 104 for reading the control parameters, and one copy is owned by the host processor 102 for updating the control parameters. This avoids conflicts between the host processor 102 and the sound processor 104 when accessing a given voice's parameter block.

When the host processor 102 has completed making modifications to a given voice's parameter block, it will toggle a control bit to notify the sound processor 104 to switch ownership to the newly modified parameter block. The alternate parameter block for that voice is then owned by host processor 102.

The parameter blocks 120 and 122 are preferably indexed using two parameter block lists. As such, the two copies of the parameter blocks for all voices are held in two parameter block lists. This allows the address of a given voice's parameter block to be easily determined through indexing. At any given time, the "active" parameter block, which is the parameter block being used by the sound processor to generate sound, will be in one of the two parameter block lists. The active parameter block will be at a fixed offset from the beginning address of the parameter block list in which it resides. It should be noted that all of the active parameter blocks for the voices do not need to be in the same parameter block list. Some voices' active parameter blocks may be in one parameter block list while other voices' active parameter blocks are in the other parameter block list.

The control bits that control which copy of each voice's parameter block is active are held in the sound processor, and are used by the sound processor as each voice needs to access its parameter block. Alternatively, the control bits can reside in a different module. For example, they could reside in the DMA engine. Depending on the setting of a voice's control bit, the voice's parameter block will be fetched from the appropriate parameter block list.

Figure 4:
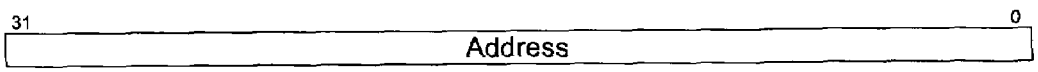
FIG. 4 is a diagram showing parameter block registers in accordance with the present invention.
Figure 4:
Figure 4:
Figure 4:
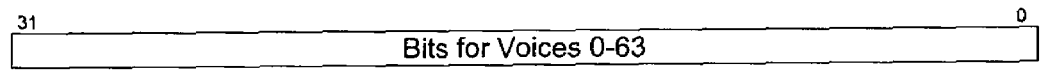
Figure 4:
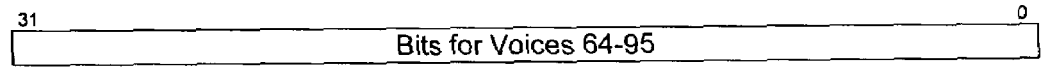
Figure 4:
Figure 4:
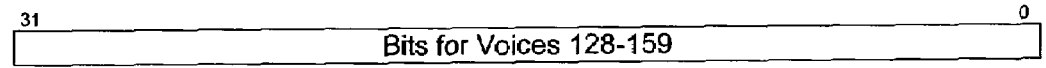
Figure 4:
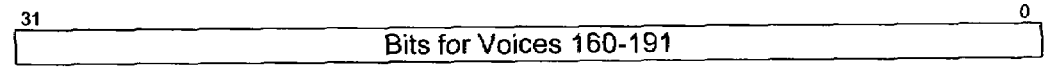
Figure 4:
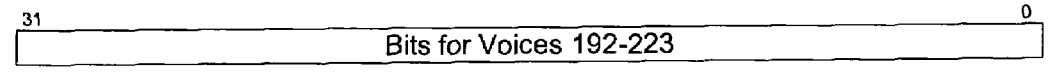
Figure 4:
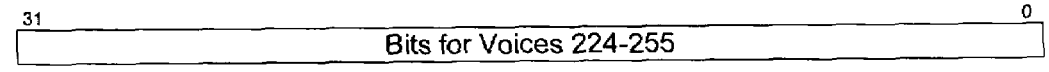

FIG. 4 is a diagram showing parameter block registers 402, 404, and 406, in accordance with the present invention. In a specific embodiment, a sound processor contains 256 voices, each of which is controlled by a 128-word parameter block. FIG. 5 is a diagram showing parameter block lists 502 and 504 before host processor updates in accordance with the present invention. Referring to FIGS. 4 and 5 together, the parameter block list A 502 starts at address 0x100000, and the parameter block list B 502 starts at address 0x200000.

The sound processor contains the following registers. The parameter block list A address register 402 contains the starting address for the parameter block list A 502. Similarly, a parameter block list B address register 404 contains the starting address for the parameter block list B 504.

A group of eight parameter block select registers 406 holds the control bits for the 256 voices. If a voice's control bit is "0", then it will fetch the parameter block from the parameter block list A. If a voice's control bit is "1", then it will fetch the parameter block from the parameter block list B.

The host processor writes the parameter block list A address register 402 with the value 0x100000 and the parameter block list B address register 404 with the value 0x200000. If at reset time all the parameter block select registers 406 contain "0x0", then the sound processor will use the parameter blocks contained in parameter block list A 502 for all the voices. The host processor can modify the parameter blocks in parameter block list B 504 without any conflict with the sound processor. For example, in order to change the control parameters for Voice 3, the host processor will modify the parameters in Parameter Block 3 in parameter block list B 504. The address of Parameter Block 3 is address 0x200600. The host processor will then write the parameter block select 0 register to set bit 3 to "1". If the sound processor needs to access the Parameter Block 3 while the host processor is accessing the Parameter Block 3, the sound processor will be directed to the Parameter Block 3 in the parameter block list A 502. Accordingly, a conflict between the host and sound processors is avoided.

One of ordinary skill in the art will readily recognize that there could be variations to the embodiments, and that any variations would be within the spirit and scope of the present invention. For example, instead of using two parameter block lists, the two sets of parameter blocks can be indexed using one list with a well-defined layout. As such, the single parameter block list would contain two parameter blocks for each voice, and the active parameter block would be determined by the control bit. Also, the ordering of the parameter blocks within the parameter block lists may be different from the order described herein. For example, the parameter blocks may be ordered from highest-numbered voice to lowest-numbered voice.

FIG. 6 is a diagram showing parameter block lists 502 and 504 after host processor updates in accordance with the present invention. The next time that the sound processor produces sound for Voice 3, and after the parameter block for Voice 3 in the parameter block list B 504 has been updated, the sound processor will use the parameter block in parameter block list B 504 (address 0x200600). The host processor will make new changes to the control parameters for Voice 3 in the parameter block in parameter block list A 502 (address 0x100600).

According to the system and method disclosed herein, the present invention provides numerous benefits. For example, the host processor can make updates to a voice's control parameters at the same time the sound processor reads the same voice's control parameters. No waiting penalty is incurred.

Embodiments of the present invention also eliminate the need for locking mechanisms, because the host processor and sound processor do not try to access the same memory block.

A method and system for controlling sound data has been disclosed. The present invention has been described in accordance with the embodiments shown. One of ordinary skill in the art will readily recognize that there could be variations to the embodiments, and that any variations would be within the spirit and scope of the present invention. For example, the present invention can be implemented using hardware, software, a computer readable medium containing program instructions, or a combination thereof. Software written according to the present invention is to be either stored in some form of computer-readable medium such as memory or CD-ROM, or is to be transmitted over a network, and is to be executed by a processor. Accordingly, many modifications may be made by one of ordinary skill in the art without departing from the spirit and scope of the appended claims.

I claim:

1. A system for controlling sound data, comprising:
a host;
a sound processor coupled to the host, the sound processor including a first control bit associated with a first voice and a second control bit associated with a second voice, the first and second control bits being writable by the host; and
a first parameter block associated with the first voice, a second parameter block associated with the first voice, a third parameter block associated with the second voice, a fourth parameter block associated with second voice, wherein the first parameter block, the second parameter block, the third parameter block, and the fourth parameter block are stored in the same memory, the first and second parameter blocks comprising a first plurality of sound control parameters corresponding to the first voice, the third and fourth parameter blocks comprising blocks comprising a second plurality of sound control parameters corresponding to a the second voice, wherein the first and second voices correspond to a plurality of sounds that are played together, and the first control bit, independent of the second control bit, determining which of the first and second parameter blocks are read by the sound processor to generate the first voice, and the second control bit, independent of the first control bit, determining which of the third and fourth parameter blocks are read by the sound processor to generate the second voice.

2. The system of claim 1 wherein the first, second, third and fourth parameter blocks are indexed by a single parameter block list.

3. The system of claim 1 wherein the first parameter block and the second parameter block are indexed by a separate parameter block list.

4. The system of claim 1 wherein after the host completes making updates to the second parameter block, the sound processor switches the state of the first control bit.

5. The system of claim 1 wherein after the host completes making updates to the second parameter block, the host toggles the first control bit in order to notify the sound processor to switch to the second parameter block.

6. A method for controlling sound data, the method comprising:
writing a first control bit and a second control bit stored in a sound processor, the first control bit, independent of the second control bit, determining which of a first parameter block and a second parameter block are read by the sound processor to generate a first voice, the second control bit, independent of the first control bit, determining which of a third parameter block and a fourth parameter block are read by the sound processor to generate a second voice;
providing the first, second, third, and fourth parameter blocks in the same memory the first and second voices corresponding to a plurality of sounds that are played together;
accessing, by the sound processor, the first parameter block in order to read a first plurality of sound control parameters, the first plurality of sound control parameters being associated with the first voice;
accessing, by the sound processor, the third parameter block in order to read a second plurality of sound control parameters, the second plurality of sound control parameters being associated with the second voice;
accessing, by a host processor, the second parameter block in order to make updates to the first plurality of sound control parameters while the first parameter block is being accessed by the sound processor;
accessing, by the host processor, the fourth parameter block in order to make updates to the second plurality of sound control parameters while the third parameter block is being accessed by the sound processor.

7. The method of claim 6 wherein the providing step comprises indexing the first and second parameter blocks using a single parameter block list.

8. The method of claim 6 wherein the providing step comprises indexing the first and second parameter blocks using a separate parameter block list for each of the first and second parameter blocks.

9. A computer readable medium containing program instructions for controlling sound data, the program instructions which when executed by a computer system cause the computer system to execute a method comprising:
writing a first control bit and a second control bit stored in a sound processor, the first control bit, independent of the second control bit, determining which of a first parameter block and a second parameter block are read by the sound processor to generate a first voice, the second control bit, independent of the first control bit, determining which of a third parameter block and a fourth parameter block are read by the sound processor to generate a second voice;
providing at least two copies of a parameter block associated with the sound data wherein the at least two copies are stored the first, second, third, and fourth parameter blocks in the same memory, wherein the parameter block comprises a plurality of control parameters corresponding to a voice, and wherein the first and second voices correspond voice corresponds to a plurality of sounds that are played together;
accessing, by the sound processor, a first copy of the at least two copies the first parameter block in order to read the a first plurality of sound control parameters, the first plurality of sound control parameters being associated with the first voice;
accessing, by the sound processor, the third parameter block in order to read a second plurality of sound control parameters, the second plurality of sound control parameters being associated with the second voice; and
accessing, by a host processor, a second copy of the at least two copies the second parameter block in order to make updates to the first plurality of sound control parameters while the first parameter block is being accessed by the sound processor;
accessing, by the host processor, the fourth parameter block in order to make updates to the second plurality of sound control parameters while the third parameter block is being accessed by the sound processor.

10. The computer readable medium of claim 9 wherein the providing step comprises program instructions for indexing the first and second parameter blocks using a single parameter block list.

11. The computer readable medium of claim 9 wherein the providing step comprises program instructions for indexing the first and second parameter blocks using a separate parameter block list for each of the first and second parameter blocks.

* * * * *